(No Model.)
C. A. BURR.
VEHICLE BRAKE.
No. 352,115.  Patented Nov. 9, 1886.
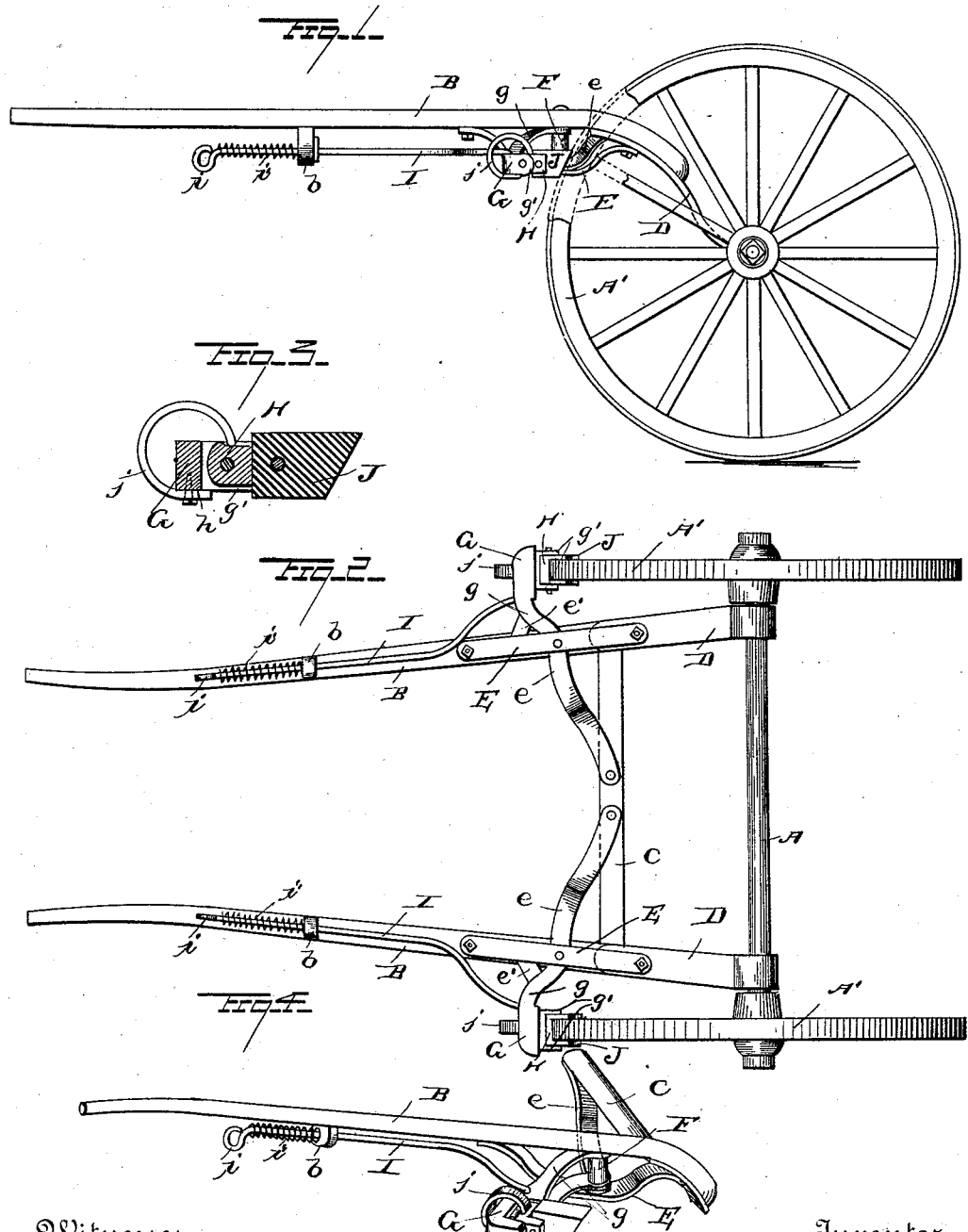

UNITED STATES PATENT OFFICE.

CHARLES A. BURR, OF ROCKDALE, NEW YORK.

VEHICLE-BRAKE.

SPECIFICATION forming part of Letters Patent No. 352,115, dated November 9, 1886.

Application filed August 4, 1886. Serial No. 210,028. (No model.)

*To all whom it may concern:*

Be it known that I, CHARLES A. BURR, a citizen of the United States, residing at Rockdale, in the county of Chenango and State of New York, have invented a new and useful Improvement in Vehicle-Brakes, of which the following is a specification.

My invention relates to brakes for wagons, carriages, and other similar vehicles, and the object of my invention is to produce a brake which shall be applied to the vehicle-wheels by the horse, and which shall not prevent the animal from backing the vehicle.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a side elevation of a portion of a vehicle with my improved brake applied thereto. Fig. 2 is an under side plan view of the same. Fig. 3 is a detached view of the brake, showing the hinge for the brake-shoe. Fig. 4 is a view of one of the shafts detached, showing the braking apparatus in perspective.

In the said drawings, A designates the vehicle-axle; B, the shafts; C, the cross-bar of said shafts, and D the thills of the same.

E designates a U-shaped strap of metal, which is secured at one end to the under side of the thill and at its opposite end to the under side of the shaft. This strap is braced laterally by a bar, $e$, the lower end of which is secured to the bend of the strap, while its upper end is secured to the cross-bar C. A bar, $e'$, is connected at its lower end to the bend of said strap, and at its upper end to the shaft B, and also braces the strap E laterally.

F designates a post, which extends upwardly from the bend of strap E, and is inserted at its upper end in the lower side of shaft B. Upon this post are pivoted the arms $g$ of a lever, G, the outer end of which extends in line with the tire of the wheel A'. Upon the rear side of the outer end of this lever G are formed two lugs, $g'$, between which is pivoted the brake-block H, as shown.

I designates a rod, the rear end of which is pivoted to the outer end of lever G, and which extends forwardly beneath the shaft B. A guide-loop, $b$, is secured to the under side of the shaft B, and through this loop works the rod I. The forward end of this rod is provided with a loop or hook, $i$, to receive the end of the back-strap of a harness. It will thus be seen that when the horse lies back upon the back-strap or breeching the rod I will be pushed backward, so as to move the outer end of lever G against the wheel A' and thus apply the brake. When the animal commences to draw the vehicle, the brake is released by a spring, $i'$, which surrounds the rod I in front of the loop $b$.

J designates the brake-shoe, which is of rubber, leather, or other suitable material, and which is secured within the block H. This shoe is held in normal operative position by a spring, $j$, one end of which is secured to the under side of the bottom $h$ of brake-block G, and the opposite end of which lies between the brake-block and the shoe, the arrangement being such that when the wheels are turning backward during the backing of the vehicle the shoe will be thrown upward out of operative position and rendered non-effective, so that the vehicle may be readily backed without interference.

I have described but one of the brakes; but it is to be understood that there are two brakes, just alike—one for each wheel.

Having thus described my invention, what I claim as new, and desire to secure by Letters Patent, is—

1. The combination, of the swinging brake-lever pivoted to the thills, an endwise moving rod connected to the brake-lever, the brake-shoe pivoted in the free end of the brake-lever and carrying a brake-block capable of upward movement thereon independently of the lever, and the curved spring attached at one end directly to the brake-lever and bearing downwardly at its free end upon the pivoted shoe, substantially as described, for the purpose set forth.

2. The combination of the strap E, having the braces $e\ e'$ and post F, the lever G, pivoted upon said post, the block H, pivoted upon said arm and carrying the shoe J, the spring $j$, for holding said block in normal position, and the rod I, having the spring $i$, substantially as specified.

In testimony that I claim the foregoing as my own I have hereto affixed my signature in presence of two witnesses.

CHARLES A. BURR.

Witnesses:
JOHN POWERS,
JERRY F. BARSTOW.